No. 774,534. PATENTED NOV. 8, 1904.
J. W. ROCKAFELLOW.
TROLLEY.
APPLICATION FILED AUG. 18, 1904.
NO MODEL.
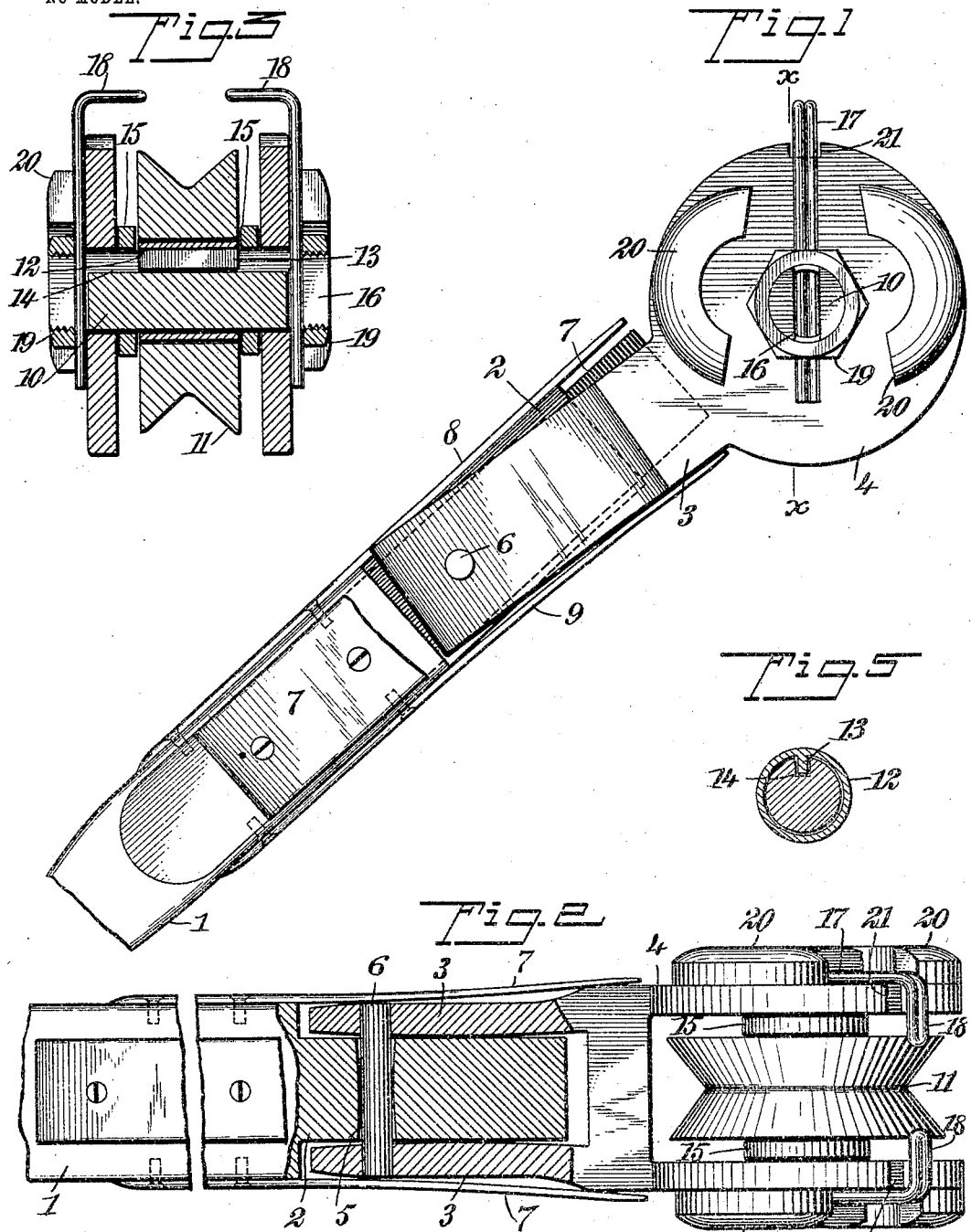
WITNESSES:
INVENTOR
John W. Rockafellow
BY 
ATTORNEYS No. 774,534. Patented November 8, 1904.

UNITED STATES PATENT OFFICE.

JOHN W. ROCKAFELLOW, OF SERGEANTSVILLE, NEW JERSEY.

TROLLEY.

SPECIFICATION forming part of Letters Patent No. 774,534, dated November 8, 1904.

Application filed August 18, 1904. Serial No. 221,212. (No model.)

*To all whom it may concern:*

Be it known that I, JOHN W. ROCKAFELLOW, a citizen of the United States, and a resident of Sergeantsville, in the county of Hunterdon and State of New Jersey, have invented a new and Improved Trolley, of which the following is a full, clear, and exact description.

This invention relates to improvements in trolleys for electric-railway cars receiving current from suspended wires or conductors, the object being to provide a trolley with a simple device to prevent the trolley from jumping off the conductor, the said device being adjustable to adapt the same to conductors of different shapes or sizes.

A further object is to provide for a yielding movement of the trolley in all directions with relation to the pole, thus preventing breaking or damage from shocks in passing over wire connections, switches, or the like.

I will describe a trolley embodying my invention and then point out the novel features in the appended claims.

Reference is to be had to the accompanying drawings, forming a part of this specification, in which similar characters of reference indicate corresponding parts in all the figures.

Figure 1 is a side view of a trolley embodying my invention. Fig. 2 is a plan view thereof, partly in section. Fig. 3 is a section on the line *x x* of Fig. 1. Fig. 4 shows a trolley-supporting bolt employed, and Fig. 5 is a cross-section thereof with a bearing-bushing thereon.

Referring to the drawings, 1 designates a trolley-pole substantially of the usual construction, but having a reduced portion 2, against opposite sides of which the shank members 3, extended from the harp 4, engage.
The reduced portion 2 is provided with a hole 5, through which a pivot-pin 6 passes, the said pin being connected to the shank members 3, and it will be noted that the hole 5 is tapered or enlarged from its center outward in both directions, thus permitting the pin 6 not only to turn axially, but to have a rocking motion, so that the harp may have movements practically in all directions with relation to the pole. Spring-plates 7 are connected to oppo- site sides of the trolley-pole and engage at their ends with the harp near its junction with the shank members 3. Also secured to the upper and lower sides of the pole and engaged with the harp member are spring-plates 8 9. When the trolley is in engagement with the wire or conductor, it will depress downward against the bottom spring 9; but should this spring become broken the top spring 8 will serve to hold the trolley in position.

Removably extended through the side members of the harp is a bolt 10, which supports the trolley 11. As here shown the trolley is mounted to rotate directly on a bushing 12, which extends around the bolt 10, and is prevented from rotary motion with relation to the bolt by means of a web 13, formed on the inner side of the bushing and engaging in a longitudinal channel 14, formed in the bolt. Arranged between the side members of the harp and the trolley are washers 15, which will prevent wear of the trolley against the harp. At its projected ends the bolt 10 is screw-threaded, and these ends are provided with notches or openings 16, and in these notches guard-hooks 17 are adjustable transversely of the trolley-axis—that is, the inwardly-turned hook portions 18, which project slightly over the trolley, may be adjusted outward and inward with relation to the periphery of the trolley, so that said hook portions may engage over a wire or conductor to prevent the trolley from jumping off the same.

The guards are held as adjusted by means of nuts 19 engaging with the threaded ends of the bolt, and to prevent these nuts or projected ends of the bolt from engaging with an obstruction should the trolley possibly slip off the wire I provide on the outer sides of the harp front and rear of the nuts segmental guard-blocks 20, which, as clearly indicated, are transversely rounded or curved. The side members of the harp are provided with notches 21 near the top to receive the hook portions 18 of the guards when it is desired to move the same close to the trolley.

Having thus described my invention, I claim as new and desire to secure by Letters Patent—

1. A harp, a trolley mounted therein, and guards adjustable on the harp toward and from the periphery of the trolley.

2. A harp, a trolley mounted therein, guards adjustable on the harp transversely of the trolley-axis, and means for clamping the guards as adjusted.

3. A harp, a bolt extended through said harp and having outwardly-projected ends provided with openings, said projected ends being threaded, clamping-nuts for engaging with the threaded portions, and guards movable in said openings and adapted to be clamped by the nuts, said guards having portions extended over the trolley.

4. A harp, a bolt extended through the harp and having a longitudinal channel, a bushing engaged around the bolt and having a part projected into said channel, a trolley mounted to rotate on the bushing, guards adjustable on the harp, and means for clamping the guards as adjusted.

5. A trolley-pole having a transverse opening, the said opening being tapered or enlarged from its center outward in both directions, a harp, shank extensions on said harp engaging the opposite sides of the pole, a pin passing through said opening in the pole and connecting the said shank members, springs secured to the upper and under sides of the pole and adapted to engage with the harp, and spring-plates on the opposite sides of the pole adapted to engage with the harp.

6. A trolley-pole, a trolley-supporting harp, a connection between said harp and the pole whereby the harp has movement vertically and laterally with relation to the pole, spring-plates secured to the upper and under sides of the pole, and spring-plates on the opposite sides of the pole each of said plates being adapted for engagement with the harp.

7. A trolley-harp, a bolt extended through the harp, a trolley mounted to rotate on the bolt, guards having adjustable connection with the bolt, and guard-blocks on the outer sides of the harp.

8. A trolley-harp, a bolt extended through the harp, the ends of said bolt being projected outward from the harp and threaded clamping-nuts for engaging with the threaded portion, guard-hooks adjustable in said bolt, and clamped by said nuts, and segmental guard-blocks on the outer sides of the harp members forward and rearward of the nuts.

In testimony whereof I have signed my name to this specification in the presence of two subscribing witnesses.

JOHN W. ROCKAFELLOW.

Witnesses:
    PHILIP E. ROCKAFELLOW,
    WILLIAM P. MASON.